Figure 1:
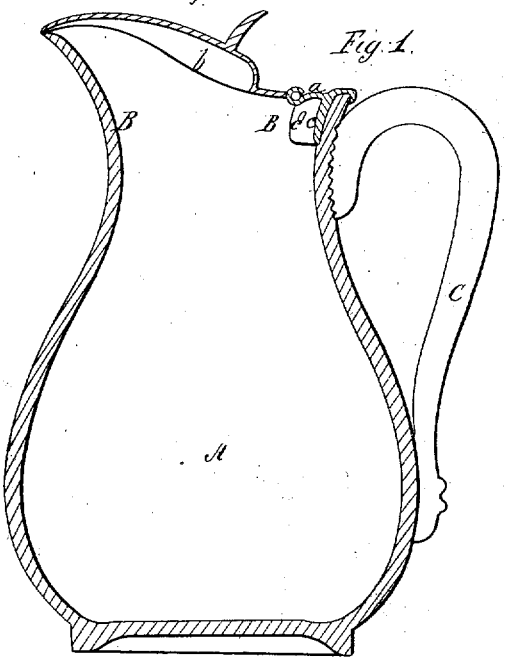

J. S. & T. B. Atterbury

Glass Pitcher.

No. 3,357. Reissued Apr. 6, 1869.

Witnesses:
R. J. Campbell
Edw. Schafer

Inventors:
Jas. S. Atterbury
Thos. B. Atterbury
by
Mason, Fenwick & Lawrence

N. PETERS, PHOTO-LITHOGRAPHER, WASHINGTON, D. C.

UNITED STATES PATENT OFFICE.

J. S. ATTERBURY AND T. B. ATTERBURY, OF PITTSBURG, PENNSYLVANIA.

IMPROVEMENT IN THE MANUFACTURE OF GLASSWARE.

Specification forming part of Letters Patent No. 75,110, dated March 3, 1868; Reissue No. 3,357, dated April 6, 1869.

*To all whom it may concern:*

Be it known that we, JAMES S. ATTERBURY and THOMAS B. ATTERBURY, of Pittsburg, in the county of Allegheny and State of Pennsylvania, have invented a new and useful Improvement in the Manufacture of Glassware; and we do hereby declare that the following is a full, clear, and exact description thereof, reference being had to the accompanying drawings, forming part of this specification.

Our invention relates, chiefly, to the manufacture of ewer-mouthed glassware, and is designed to secure the formation of the upper edge or rim of the glass vessel (which, being ewer-mouthed, has a compound curvature) of such exactly uniform shape that a metallic cap or cover of definite correspondingly-curved shape, attached to the vessel and shutting down onto the naked glass rim, may fit closely thereto.

Our invention also embraces an improved mode of perforating glassware, so as to attach a cap or cover to it by means of rivets. The ordinary mode of making ewer-mouthed glass vessels—such as molasses or cream pitchers—is to shape the ewer-mouthed top with the usual tools by hand; but it was found practically impossible to make the glass lip of the exact shape to fit the metallic cap or cover, so that an ewer-mouthed glass vessel with a close-fitting metallic cover, fitting so nicely to the naked glass surface as to make a close joint, was practically impossible, owing to the impossibility of hand-shaping the curved rim or edge of the glass so exactly as that the metallic cover, which has a fixed curve, shall exactly fit down upon it. This exact uniformity of shape can only be secured in practice by blowing or pressing the article in a mold, which will give exactness of outline and uniformity of size and shape to a succession of similar articles made therein; but an ewer-mouthed glass vessel had never been successfully made in a mold until we solved the problem and produced a ewer-mouthed glass pitcher, the upper part or ewer-mouth of which, being blown in a mold, is in every successive piece a fac-simile of its predecessors.

To enable others skilled in the art to use our invention, we will proceed to describe it more fully, referring to the drawings, in which—

Figure 2:
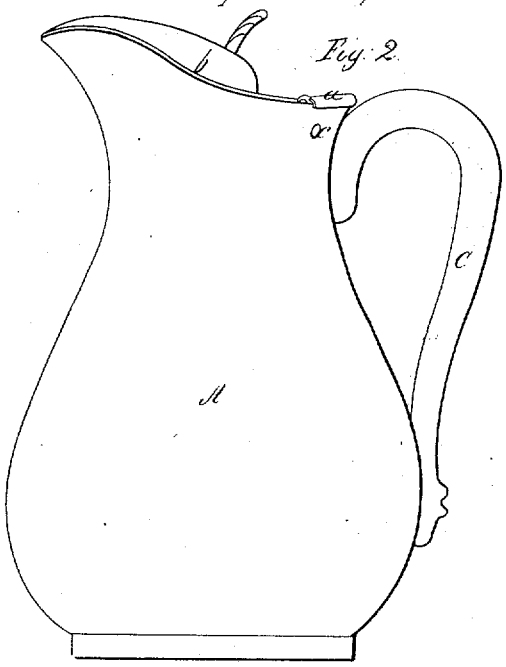
Figure 3:
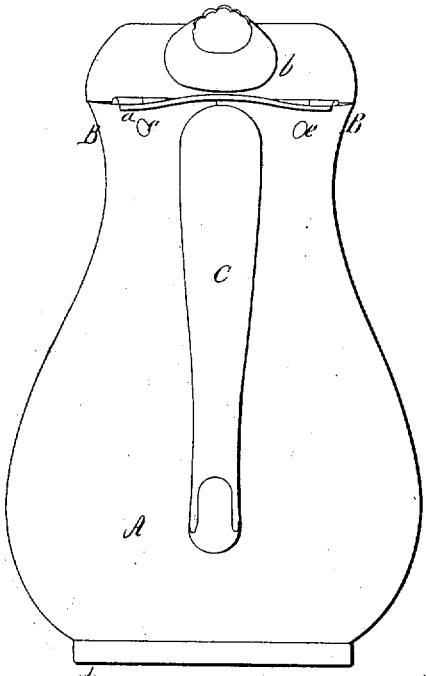
Figure 5:
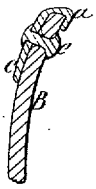
Figure 4:
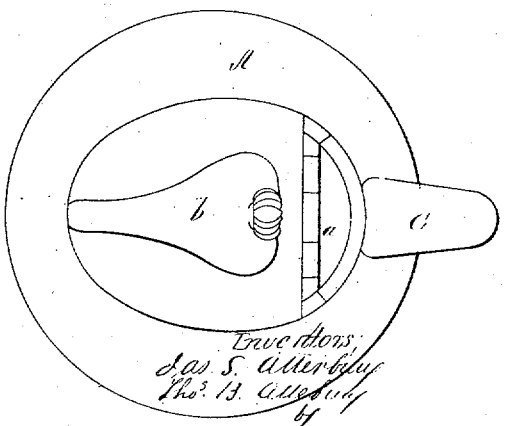

Figure 1 is a vertical section through a molasses or cream pitcher of our improved construction. Fig. 2 is a side view of the same. Fig. 3 is an elevation or view of the back part of the pitcher. Fig. 4 is a top view of the same. Fig. 5 is a sectional view of a part of the pitcher through which are the rivet-holes, showing the mode of attachment.

Like letters of reference denote similar parts in all the figures.

In the accompanying drawings, A represents the body of the pitcher, which is such as we have described, all of which may be blown in a mold, or only the upper part, on the naked rim of which the metallic cover is to sit, the object being, as before stated, to make the curved rim of the exact required shape.

To blow in a mold an article of glassware having the irregular curved shape of an ewer-mouthed pitcher is a matter of great difficulty, if not impossibility, by means of the appliances ordinarily used, owing to the fact that the glass has to extend so much farther in one direction than in the other that the glass will be of so irregular thickness as to be practically useless. This difficulty we overcome by means of an improved mold invented by us, and which is fully described in another application for a patent. This mold, the lower part of which is of the required shape for the body of the pitcher, has a recess in the upper part of larger size circumferentially than the rim or upper edge of the glass pitcher to be made. This recess is for the "blow-over," as it is termed by the glass-blowers. This blow-over tapers down to a sharp edge at its circumference, so that the glass will be formed thinner there than elsewhere, and the blow-over can easily be broken off along that edge, leaving the rim of the glass of the exact required shape.

In order to prevent the glass being too thin on the ewer mouth or lip of the pitcher, or too thick on the sides, owing to the oval shape of the top of the pitcher and the length of the ewer-mouth, we place the neck or opening of the mold very near to the ewer-mouthed lip, so that the glass, not having so far to travel, will be a little thicker at that point than elsewhere. By adjusting the position of the neck or opening of the mold we secure a uniform thickness of the glass all around, excepting that we prefer to make the glass a little thicker at the ewer-mouth than at other points in the rim.

In order to make the perforations for insertion of the riveting-pins *e e*, by which the cap or cover is fastened to the top of the pitcher, as seen in Fig. 5, we have pins or pointed studs projecting from the surface of the mold in the proper positions where the rivets are to pass through the glass. These pins or studs on the mold, when the glass is blown in the mold, leave impressions or indentations in the glass, not making holes through the glass, but leaving it so thin at those points that a slight blow with a pointed bore will make a hole without danger of fracturing the body of the glass.

The cover of the pitcher is made of metal, in the usual manner, of any desired pattern, but so shaped as to fit exactly on the rim of the pitcher. It may be made with a fixed piece, *a*, to which is hinged the lid or cap-piece *b*. The piece *a* is made with a lip, *c*, which extends below the rim of the pitcher, and fits snugly to the inside of the pitcher diametrically opposite to the ewer mouth or lip, as shown in Fig. 1, and covering the holes in the glass made by the studs in the mold, as before described. Holes are made in this metallic lip *c*, corresponding to the holes in the glass, and through these holes in the glass and metallic lip *c* rivets of soft metal are passed, which are fastened by upsetting, or with a soldering-iron, which will melt the ends of the rivets and unite them to the metallic lip *c*. This forms a firm and substantial fastening, much neater and better than the old mode of fastening with cement.

By blowing the glass pitcher in a mold, as before described, so constructed as to shape the ewer-mouth and rim, ewer-mouthed pitchers can be made of such exactly uniform size and shape as that the metallic covers will fit exactly onto the naked glass rim.

By making holes in the glass for riveting the covers, in the manner above described, there will be no danger of breaking the pitchers during the process, and the work can be speedily and neatly done, and by fastening on the cover with rivets a permanent attachment is readily effected.

Having thus described our invention, what we claim as new, and desire to secure by Letters Patent, is—

1. As a new article of manufacture, a glass ewer-mouthed pitcher or vessel having its upper part, at least, blown in a mold, so that the edge or rim may be of such definite curved shape as that a metallic cap or cover of a corresponding curved shape shutting down upon the naked glass rim may fit it exactly.

2. The mode hereinbefore described of perforating glass vessels for riveting covers thereto.

3. Making ewer-mouthed glass pitchers or vessels by blowing the upper or rim portion, at least, in a mold, and attaching metallic covers thereto in such manner as that the cover may fit closely to the naked glass rim, substantially as described.

In testimony whereof we, the said J. S. ATTERBURY and T. B. ATTERBURY, have hereunto set our hands.

J. S. ATTERBURY.
T. B. ATTERBURY.

Witnesses:
M. SCHRADER,
JOHN C. STEVENSON.